May 3, 1949.  G. E. ROEDDING  2,469,207
SPRING MOUNTED TWO-POSITION PRISMOIDAL
REAR-VIEW MIRROR
Filed Oct. 12, 1946
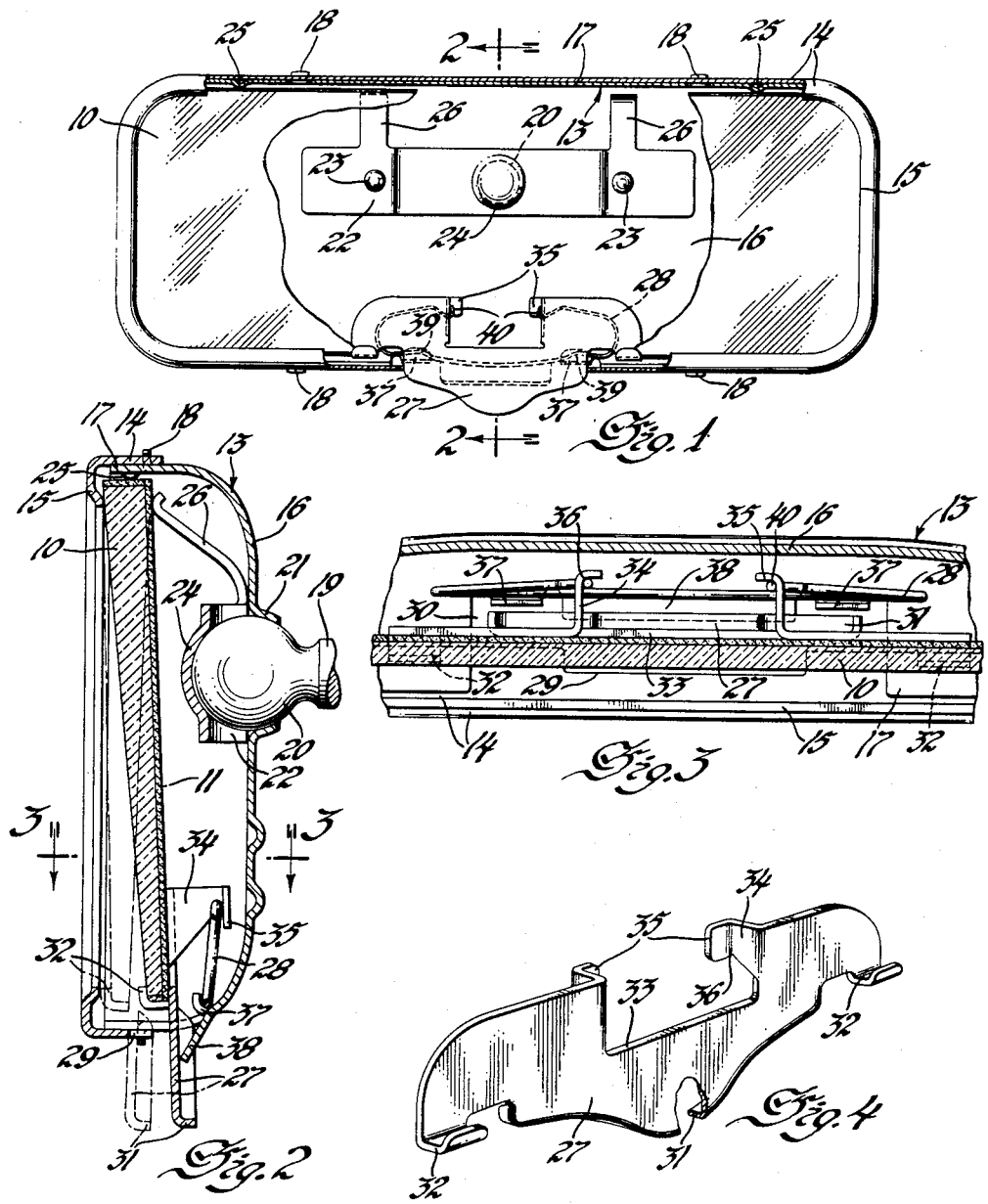
Inventor
Gordon E. Roedding
By
Spencer, Willits, Helming & Baillio
Attorneys Patented May 3, 1949

2,469,207

UNITED STATES PATENT OFFICE 2,469,207

SPRING MOUNTED TWO-POSITION PRISMOIDAL REAR-VIEW MIRROR

Gordon E. Roedding, Anderson, Ind., assignor to General Motors Corporation, Detroit, Mich., a corporation of Delaware Application October 12, 1946, Serial No. 702,900

14 Claims. (Cl. 88—98)

This invention relates to an improved prismoidal rear-view mirror for automobiles. The prismoidal mirror has a reflector with a transparent low-efficiency reflecting suface disposed in front of and at a small angle to a high-efficiency reflecting surface, so that by tilting the reflector slightly the driver can bring to his eyes either a dim or a bright image of the same object.

The principal object of this invention is to provide in a mirror of the type described, in which the reflector is pivotally mounted so that it can be shifted from one position to the other and held in the last-mentioned position, a simplified pivot and snap-action spring mechanism suitable for mass production and assembly.

Another object of the invention is to provide a prismoidal mirror mounting wherein the mirror is pivoted on a fulcrum and supported by the snap-action positioning spring.

Another object of the invention is to provide a pivotal mounting for a prismoidal mirror wherein the snap-action spring also holds the handle on the reflector and the reflector on the pivot means.

For a better understanding of the nature and objects of this invention, reference is made to the following specification wherein the preferred illustrated embodiment is described.

Figure 1 is a front elevation, with parts broken away and in section, of my rear-view mirror.

Figure 2 is an enlarged section on line 2—2 of Figure 1.

Figure 3 is a partial section on the line 3—3 of Figure 2 showing a top view of the swinging mechanism.

Figure 4 is a perspective view of the mirror cradle.

In the drawing the numeral 10 indicates the prismoidal mirror or reflector member, which consists of a generally rectangular plate of glass or other suitable material with flat front and rear faces disposed vertically at a small angle to each other, e. g., about 3½°, to separate the images from the front and rear surfaces sufficiently that, at the distance of the driver's eyes from the mirror, only one image at a time is visible. The front reflecting surface is highly polished and bare, but the rear reflecting surface is coated with suitable reflecting material, such as silver. The top edge and rear surface of the mirror may be protected by suitable sheet material 11, such as paper or fiber, adhered to the mirror. This protective sheet 11 may cover the lower edge of the reflector along the full length of the reflector or as shown in the drawing only at the cradle support hooks 32.

The mirror is positioned in a housing generally indicated by the numeral 13 and consisting of a rectangular frame 14 with an inturned flange 15 engaging the upper margin of the front face of the mirror, and a rear section 16 with a forwardly extending flange 17 positioned within the frame 14. The frame is separably secured to the rear section by suitable means such as detent tabs 18 struck outwardly from flange 17 and projecting through slots in the frame 14.

The housing is adjustably mounted on the conventional automobile mirror supporting arm 19, which extends through an aperture in the rear section and terminates in ball 20. This aperture is provided with a flange 21 which forms a partial spherical seat for the rear side of the ball 20. A spring strap 22 is secured by suitable means, such as rivets 23, to the inside face of the rear section 16, and has a partial spherical seat 24 for the front side of the ball 20. The ball 20 is frictionally clamped between the seats in the mounting plate and the spring strap, to provide an adjustable mounting for the mirror housing.

The mirror 10 is pivotally positioned within the housing as shown in Figure 2. The bright-image position is shown in solid lines, while the dim-image position is shown in dash-and-dot lines. At the top of the rear section of the housing the flange 17 has two stamped fulcrum points 25, which engage the top of the mirror 10 and provide a pivot line for the swinging movement. The mirror is held in lateral position with respect to the fulcrum points by flange 15 of the frame and by spring fingers 26, which may be formed integrally with the spring strap 22.

The mirror is supported in position for pivotal movement about the fulcrum 25 by the cradle 27 hooked over the lower edge of the mirror and compression spring 28 pivotally mounted between the housing and the cradle. The housing has a central opening in the lower edge, permitting a part of the cradle to extend below the housing to provide a handle. This opening is formed by recess 29 in the frame 14 and recess 30 is the flange 17. The cradle element, shaped as shown in Figure 4, has a stiffening flange 31 along the hand-grip portion. At each side of the grip portion there is provided a U-shaped support hook 32 to engage the lower edge of the mirror. The cradle 27 has a central recess 33 in the upper edge, and from each side edge of the recess a tongue 34 extends away from the mirror. Each tongue has an enlarged lug 35 at right angles to the tongue to provide a seat or hook 36 for the top of spring 28. The lower seat for the spring is formed by two inwardly and upwardly bent tabs 37 formed in the rear section 16 of the housing along the edge of recess 30. Between the tabs 37 an elongated stop tab 38 provides a stop for the rearward travel of the mirror. The forward motion is stopped when the cradle 27 abuts the frame 14 or the supports 32 abut the flange 15. Stop tab 38 is positioned so that the angle through which the mirror swings in moving from one to the other of its limits is just that necessary to shift the image from one reflecting surface out of the driver's eyes, and the image from the other reflecting surface into the driver's eyes.

The wire spring 28 when placed under compression in the seats 36 and 37 is shaped approximately like a recumbent C. The lower portion of the wire spring has two undulations 39 coinciding with and positioning the spring on the tab seats 37 of the housing. The upper free ends of the wire spring have a hook 40 engaging the seat 36 of the cradle 27.

As shown in Figure 2 the reflector pivots on the fulcrum 25, and is held on the fulcrum points by flange 15 of the housing frame and spring fingers 26. The cradle member 27 is hooked over the lower edge of the reflector 10 and need not be secured thereto. The wire spring 28 thus holds the cradle on the reflector and the reflector on the fulcrum points. When the reflector is in the rear position (solid lines) the spring 28 holds the mirror against stop 38. Forward movement of the mirror further compresses the spring, and after the mid-point is passed the spring expands and urges the mirror to the front position (dash-and-dot lines) against the frame 14. The return movement of the mirror is similarly resisted and aided by the spring.

I claim:

1. In a mirror, a housing consisting of a front frame section and a rear section, opposed recesses in both sections providing an aperture, a member which includes a low efficiency reflecting surface disposed in front of and at an angle to a high efficiency reflecting surface mounted in the housing so that it can pivot about an edge, means pivoting said member to the housing, means engaging said member and extending through the aperture in said sections, a spring seat attached to said means, spring means under compression positioned between said spring seat and said housing to hold said engaging means on the member and said member in contact with the pivot means.

2. In a mirror, a housing with an open side and aperture in an edge, a member which includes a transparent low efficiency reflecting surface disposed in front of and at a small angle to a high efficiency reflecting surface mounted in the housing so that it can rock about an edge, a fulcrum pivot on the housing engaging said member, a flanged aperture in the housing, means secured to the housing forming with the flanged aperture a ball socket, said means including a spring tongue engaging said member to hold the member on the fulcrum, a cradle extending through said aperture and engaging said member, a spring seat on said cradle, a spring biased between the spring seat and said housing to support said member.

3. In a mirror, a member which includes a transparent low-efficiency reflecting surface disposed in front of and at a small angle to a high-efficiency reflecting surface, a substantially rectangular housing completely enclosing said member, a large aperture in the front face of said housing for admitting light to said reflecting surfaces, a small opening in an edge of said housing, said member being mounted for pivotal movement about the opposite edge of said housing, a handle element having a support hook, said handle being positioned outside of said housing and extending through said small opening and said hook engaging the edge of said member, a spring seat on said handle element, a spring seat on said housing adjacent said opening, and a compression spring positioned in said spring seats.

4. The combination set forth in claim 3 in which said spring seat on said handle member is an anchor hook-shaped projection oppositely disposed to said support hook, said spring seat in said housing is a groove deformed in the housing surface, and said compression spring being a C-shaped wire spring.

5. In a mirror, a housing with an open side, a member which includes a transparent low-efficiency reflecting surface disposed in front of and at a small angle to a high-efficiency reflecting surface mounted in the housing so that it can rock about an edge, pivot means at one side of said housing engaging a side of said member, means limiting the rocking movement of said member, a cradle having a first hook engaging the opposite side of said member, said cradle having a second hook oppositely disposed to said first hook, an open spring seat in said housing facing said second hook, a recumbent C-shaped wire spring engaging said second hook and seated in said spring seat.

6. The combination set forth in claim 5, there being two second hooks and spring hooks at the ends of the C-shaped spring, the spring hooks engaging said second hooks and the back of said spring being seated in said spring seat.

7. In a mirror, a housing with an open side, a member which includes a transparent low-efficiency reflecting surface disposed in front of and at a small angle to a high-efficiency reflecting surface mounted in the housing so that it can rock about an edge, pivot means at one side of said housing engaging a side of said member, means limiting the rocking movement of said member, a cradle having a first hook engaging the opposite edge of said member, said cradle having a second hook oppositely disposed to said first hook, an open spring seat groove on the opposite side of said housing, a compression spring engaging said hook and seated in said spring seat groove.

8. In a mirror, a housing with an open side, a member which includes a transparent low-efficiency reflecting surface disposed in front of and at a small angle to a high-efficiency reflecting surface mounted in the housing so that it can rock about an edge, pivot means at one side of said housing engaging an edge of said member, means limiting the rocking movement of said member, a cradle having a first hook engaging the opposite edge of said member, said cradle having a second hook oppositely disposed to said first hook, the opposite side of said housing being deformed to provide an inwardly facing open guide groove, a loop-shaped spring placed in compression between said second hook and said groove.

9. In a mirror, a housing with an open side, a member which includes a transparent low-efficiency reflecting surface disposed in front of and at a small angle to a high-efficiency reflecting surface mounted in the housing so that it can rock about an edge, pivot means at one side of said housing engaging an edge of said member, means limiting the rocking movement of said member, a cradle having a first hook engaging the opposite side of said member, said cradle having a second hook oppositely disposed to said first hook, the opposite side of said housing being deformed to provide an inwardly facing open guide groove, a recumbent C-shaped spring with hooks at each free end, said spring hooks engaging said hook and the back of said C-shaped spring resting in said groove.

10. In a mirror, a housing having a front frame section and a rear section, said frame section consisting of side walls and an inwardly directed flange, said rear section consisting of a continuous back wall and side walls, said side walls of the frame and rear section being in telescoping relation, said telescoping side walls being recessed to form an aperture in the housing, pivot means in one of said side walls opposite said aperture, a reflector which includes a low-efficiency reflecting surface disposed in front of and at an angle to a high-efficiency reflecting surface mounted in the housing with one edge engaging said pivot means so that it can pivot about an edge, a handle extending through said aperture and having a reflector hook engaging the opposite edge of said reflector, an anchor hook attached to said handle and being reversely disposed with regard to the reflector hook, an open guide groove formation in the wall of said housing opposite said pivot means and adjacent said aperture, a compressing spring engaging said anchor hook and seated in said spring groove to support said reflector and to hold it in forward position against said frame or in a rearward position against said rear section.

11. The combination set forth in claim 10, said compression spring being a recumbent C-shaped wire loop spring, and hooks formed at the free ends of said spring, said spring hooks engaging said anchor hook and the back of said spring being seated in said groove.

12. In a mirror, a housing having a front frame section and a rear section, said frame section consisting of side walls and an integral inwardly directed flange, said rear section consisting of a continuous back wall and side walls, said side walls of the frame and rear section being in telescoping relation, said telescoping side walls being recessed to form an aperture in the housing, portions of said side wall being pressed inwardly to provide raised pivot points, a reflector which includes a low-efficiency reflecting surface disposed in front of and at an angle to a high-efficiency reflecting surface mounted in the housing with one edge engaging said pivot about an angle, a handle extending through said aperture and having a reflector hook engaging the opposite edge of said reflector, anchor hooks attached to said handle and disposed reversely with regard to the reflector hook, a tongue bent upwardly from the side wall of said rear section adjacent said aperture to provide a spring seat, a recumbent C-shaped spring with hooks at the ends thereof, said spring hooks engaging said anchor hooks and the back of said spring being seated in said spring seat to hold said handle on said reflector and said reflector in engagement with said pivot, an aperture in said rear section, a semi-spherical seat surrounding said aperture, a strap secured to said rear section and having a semi-spherical seat in alignment with said first seat to provide a ball socket, a spring tongue extending from said strap and engaging said reflector to hold it in lateral position on said pivot points.

13. In a mirror, a member which includes a transparent low-efficiency reflecting surface disposed in front of and at a small angle to a high-efficiency reflecting surface, a substantially rectangular housing completely enclosing said member, a large aperture in the front face of said housing for admitting light to said reflecting surfaces, a small opening in an edge of said housing, said member being mounted for pivotal movement between a forward position and a rear position about the opposite edge of said housing, a handle element having a support hook, said handle being positioned outside of said housing and extending through said small opening and said hook engaging the edge of said member, a spring seat on said handle element, a spring seat on said housing adjacent said opening, and a compression spring positioned in said spring seats, said hook engaging a portion of the front face of said housing to act as a stop for said member in the forward position and a positionable stop tab on said housing engaging said handle to act as a stop for said member in the rear position.

14. In a mirror, a member which includes a transparent low-efficiency reflecting surface disposed in front of and at a small angle to a high-efficiency reflecting surface, a substantially rectangular housing completely enclosing said member, a large aperture in the front face of said housing for admitting light to said reflecting surfaces, a small opening in an edge of said housing, said member being mounted on a pivot on the opposite edge of said housing for pivotal movement between a forward position and a rear position so that the reflection from the high and low efficiency reflecting surface will take substantially the same path, a handle element having a support hook, said handle being positioned outside of said housing and extending through said small opening and said hook engaging the edge of said member, a spring seat on said handle element, a spring seat on said housing adjacent said opening, and a compression spring positioned in said spring seats, said spring seats and said pivot being in alignment in a central position, and said spring urging said member over center toward either forward or rear position.

GORDON E. ROEDDING.

REFERENCES CITED

The following references are of record in the file of this patent:

UNITED STATES PATENTS

| Number | Name | Date |
| --- | --- | --- |
| 1,909,526 | Falge et al. | May 16, 1933 |
| 2,356,432 | Roedding | Aug. 22, 1944 |